United States Patent [19]

Kreiter

[11] Patent Number: 5,666,940
[45] Date of Patent: Sep. 16, 1997

[54] POST-SUPPORTED BARBECUE ASSEMBLY

[75] Inventor: James H. Kreiter, 18155 S. Abiqua Rd. NE., Silverton, Oreg. 97381

[73] Assignee: James H. Kreiter, Silverton, Oreg.

[21] Appl. No.: 539,378

[22] Filed: Oct. 5, 1995

[51] Int. Cl.⁶ .................... A47J 37/00; F24B 3/00
[52] U.S. Cl. .................... 126/30; 126/9 R; 126/25 A; 99/450
[58] Field of Search .................. 99/339, 340, 444–450, 99/481, 482; 126/25 R, 25 A, 30, 9 R, 9 B; 248/156, 161

[56] References Cited

U.S. PATENT DOCUMENTS

| | | | |
|---|---|---|---|
| 2,827,846 | 3/1958 | Karkling . | |
| 2,844,139 | 7/1958 | Lucas | 126/30 |
| 2,912,973 | 11/1959 | Lucas | 126/30 |
| 2,974,662 | 3/1961 | Forrest . | |
| 2,977,953 | 4/1961 | Dowdy . | |
| 3,067,734 | 12/1962 | Lucas | 126/30 |
| 3,152,536 | 10/1964 | Lucas | 126/30 |
| 3,162,113 | 12/1964 | Tallaksen | 126/30 |
| 3,785,360 | 1/1974 | Martin | 126/9 R |
| 4,065,085 | 12/1977 | Gellatly . | |
| 4,094,296 | 6/1978 | Beagley | 126/30 |
| 4,120,279 | 10/1978 | White | 99/340 X |
| 4,230,089 | 10/1980 | Barden . | |
| 4,351,312 | 9/1982 | Ivy . | |
| 4,538,589 | 9/1985 | Preston . | |
| 4,607,608 | 8/1986 | Allred et al. . | |
| 4,719,898 | 1/1988 | Stanislawski | 126/9 R |
| 4,854,297 | 8/1989 | Shuman | 126/25 A |
| 4,896,651 | 1/1990 | Kott, Jr. . | |
| 4,979,490 | 12/1990 | Nudo et al. . | |

*Primary Examiner*—Timothy F. Simone
*Attorney, Agent, or Firm*—Kolisch Hartwell Dickinson McCormack & Heuser

[57] ABSTRACT

A barbecue assembly including a ground penetrator that is forced into the ground. A relatively rotatable hollow standard fits over the upper end of the penetrator, with the base of the standard resting on the upper surface of the knee which projects out to one side of the standard. An adjustor is vertically positionable on the standard.

3 Claims, 2 Drawing Sheets

5,666,940

POST-SUPPORTED BARBECUE ASSEMBLY

BACKGROUND AND SUMMARY OF THE INVENTION

This invention relates to a barbecue assembly which is readily broken down for the purpose of storage or movement from one location to another, and easily reassembled at a cooking site to provide, when reassembled, a convenient and reliable system for supporting food cooked over an open fire.

The barbecue assembly when broken down takes the form of a relatively small number of components which are easily identified as to how to be reassembled, and of a size and weight which renders them easily transportable from one location to another. The components of the assembly are relatively easily assembled into an operative position usable in supporting food while cooked or warmed over an open fire.

A feature and object of the invention is to provide a barbecue assembly which includes, as one of the components thereof, a so-called ground stabilizer or penetrator, which in mounting the barbecue is the element forced into the ground to properly anchor the assembly. The stabilizer or penetrator includes a laterally outwardly projecting portion, referred to as a knee, usable in forcing the penetrator into the ground, and which also provides a stabilizing effect with the penetrator properly mounted. Rotatably supported on this penetrator is an upright standard used in the support of a cooking instrumentality at a proper elevation above the ground.

In the specific and preferred embodiment of the invention herein described, a cooking instrumentality is mounted on the standard utilizing what is referred to herein as an adjuster, which is a device which is positionable at various fixed adjusted positions on the standard, and which includes a socket or sleeve opening to one side of the standard adapted for the reception of the handle of a cooking instrumentality.

The assembly contemplated is practical, easily maintained, and producible at relatively low cost, making it an attractive item for purchase for families who enjoy outdoor cooking.

BRIEF DESCRIPTION OF THE DRAWINGS

These and other objects and advantages are attained by the invention, which is described herein below in conjunction with the accompanying drawings, wherein.

DETAILED DESCRIPTION OF THE PREFERRED EMBODIMENT

Figure 1:
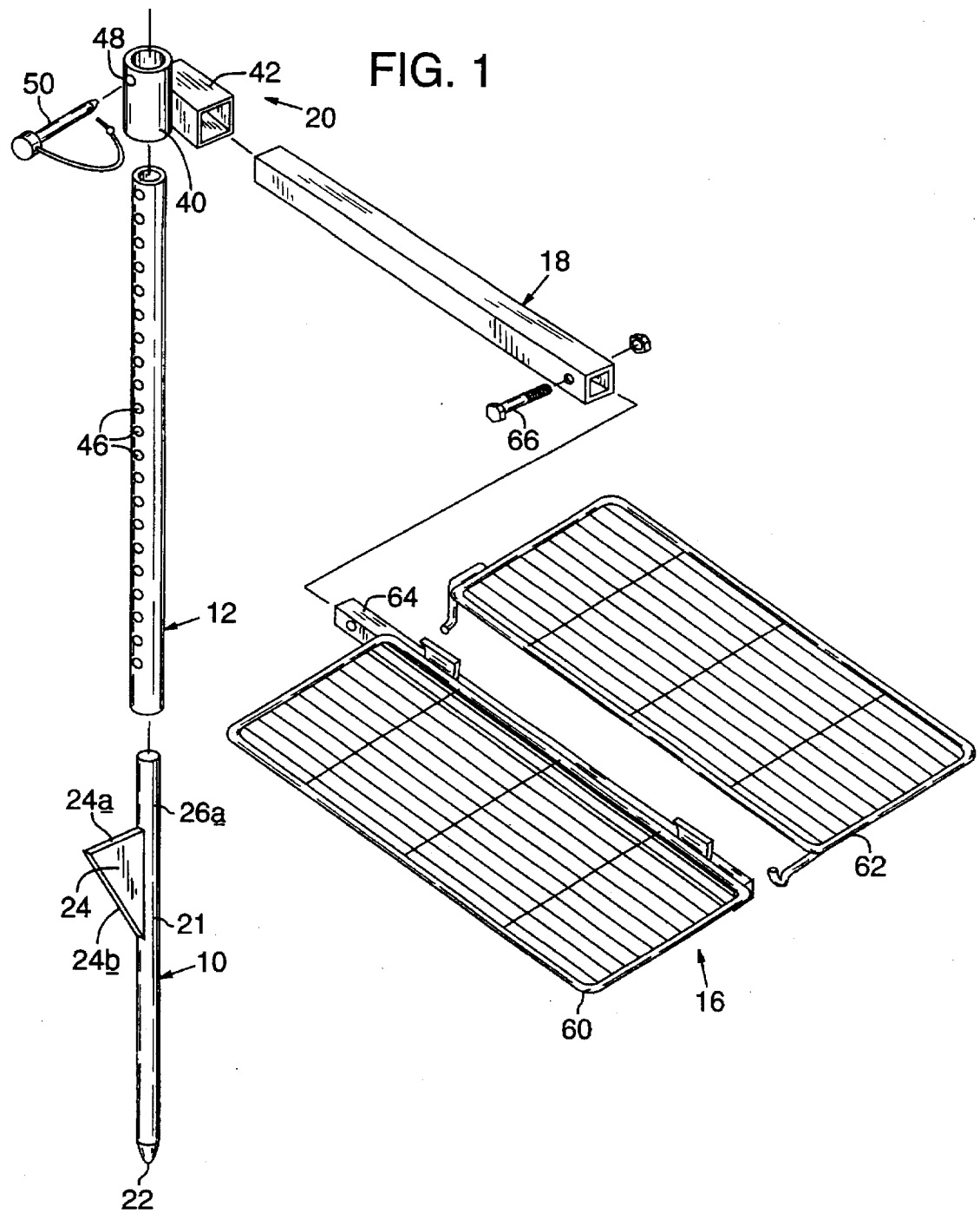
FIG. 1 is a perspective, exploded view, illustrating components in the assembly.

Referring now to the drawings, the barbecue assembly illustrated comprises what is referred to herein as a ground penetrator or stabilizer, indicated at 10, and detachably supported thereon, an elongate detachable standard 12.

A cooking instrumentality, such as the foldable grill generally indicated at 16, is mounted on the standard, utilizing a grill extension (or handle portion) 18, and an adjuster 20 which, as will be hereinafter described, is shiftable to various fixed positions on the standard and is constructed to support extension 18 in a generally horizontal position in any of its adjusted positions.

Considering first of all details of the ground penetrator, such includes a cylindrical rod or shank portion 21 having a sharpened ground-penetrating lower end 22 which is adapted to be forced into the ground. Joined to the penetrator, at a location disposed upwardly from its sharpened lower end, is what is referred to herein as a knee 24. In the specific form of the invention illustrated the knee takes the form of a generally triangular piece which may be secured as by welding to the main body of the penetrator and which is bounded by an upper, force-receiving surface 24a. Extending along the side of the knee is an inclined surface 24b which, by reason of its incline, promotes entry of the knee into the ground when the penetrator urged into the ground.

An upper end 26 of the penetrator extends upwardly from the knee.

Standard 12 may take the form of an elongate hollow tube, with the tube having an inner diameter only slightly exceeding the outer diameter of shank portion 21 in the ground penetrator. This tube may be fitted over the upper end of the ground penetrator with the tube sliding down on the shank portion until its lower end abuts knee 24. In this position, the standard is relatively rotatably supported on the ground penetrator.

Figure 2:
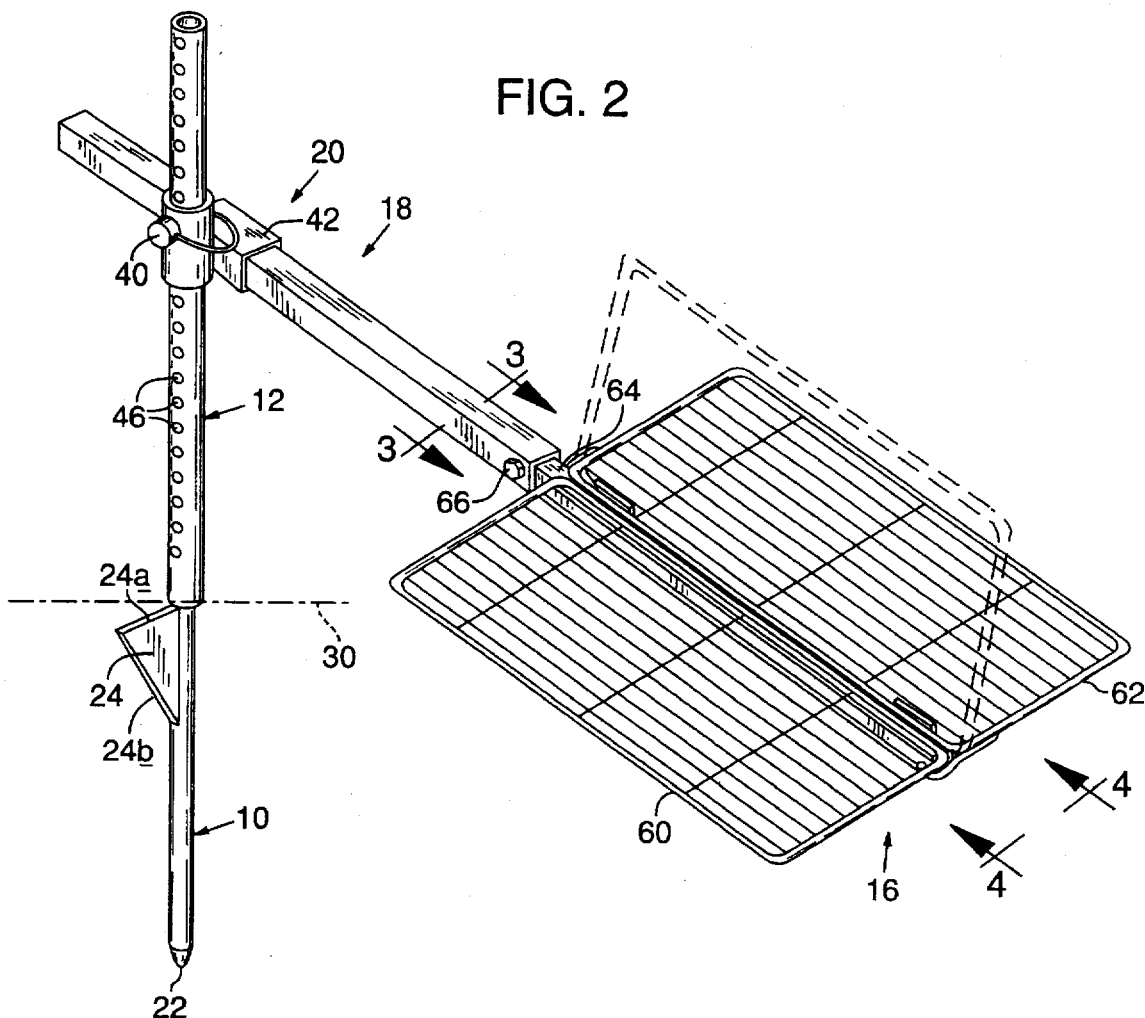
FIG. 2 is a perspective view illustrating the components assembled together in an operative position.
Figure 3:
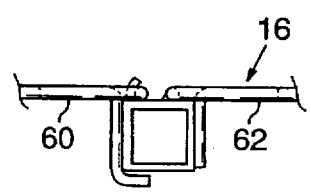
FIGS. 3 and 4 are cross-sectional views further illustrating certain details of the invention.
Figure 4:
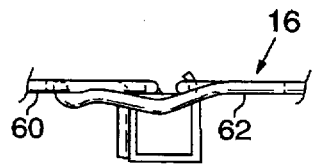

In assembling the barbecue in an operative position, the ground penetrator is forced into the ground to place upper surface 24a substantially at ground level 30 (see FIG. 2). With softer soil, this may be readily done using the foot pushed against upper surface 24a of the penetrator while stabilizing the penetrator by supporting its upper end. When using the foot, this stabilizing may be done by mounting the standard on the upper end of the penetrator and manually holding the standard while pushing on knee 24. With harder soils, it may be convenient to pound on upper surface 24a, while properly supporting the upper end of the penetrator.

With the penetrator lodged in the ground, surface 24a provides a visual indication to the user that the penetrator is at proper depth. The knee provides stability restraining rotation of the penetrator, and also restraining lateral displacement of the penetrator at its upper end.

Adjuster 20 includes a collar portion 40 adapted to fit snugly about standard 12. Joined as by welding to a side of the collar portion is a sleeve or socket portion 42 which opens to a side of the collar portion. The adjuster may be adjusted to different elevations along the side of the standard 12, and is detachably securable at different selected positions with a pin and socket construction provided for this purpose. Further explaining, a series of bores 46 is provided along one side of the standard and extending through collar portion 40 is a bore 48. Bore 48 is registrable with selected ones of the bores 46, and when in proper registered position, the adjuster is secured in place with a pin 50.

Socket 42 has a non-circular, i.e., square cross section. Grill extension 18 has a similar matching cross section, enabling the extension to be telescopically received within the socket portion with the extension then having a horizontal position.

Grill 16 in the embodiment illustrated has a pair of relatively foldable grill sections 60, 62 supported on a base 64. The base is detachably mounted on the end of grill extension 18, with nut and bolt assembly 66 used to secure the two parts together.

It should be obvious that an assembly has been described which is relatively easily set up in operative position adjacent a cooking fire. With the ground penetrator in place, the standard 12 together with the grill supported thereon is relatively rotatable about the axis of shank 21 in the penetrator to enable the grill to be swung to either side. The grill may be extended or retracted within socket portion 42 to proper adjustment of the extension in the direction of its axis. The elevation of the grill is easily established at different levels through sliding of collar portion 40 in the adjuster along the length of the standard and securing it in proper place with pin 50.

If impaction is to be performed to drive the penetrator into the ground, such is done by striking the upper surface of the knee rather than the upper end of shank portion 21. With many soil conditions, the proper penetration may be performed by striking the foot against the top surface of the knee in the ground penetrator while holding the penetrator in proper upright position with the standard if desired. The assembly is a practical combination of components which is easily broken down for storage or transportation purposes.

While an embodiment of the invention has been described, it should be obvious that variations and modifications are possible without departing from the invention. It is desired to cover all such modifications and variations as would be apparent to one skilled in the art.

It is claimed and desired to secure by Letters Patent:

1. A post-supported barbecue assembly comprising:

an elongate ground penetrator having a lower ground-penetrating end and an upper end, a knee secured to the ground penetrator intermediate the ends of the penetrator, an elongate standard rotatably supported on and detachably mounted on the upper end of the ground penetrator, a collar adjustably positionable along the length of said standard, and a cooking instrumentality removably mounted on said collar.

2. The barbecue assembly of claim 1, which further includes a sleeve joined to said collar, said cooking instrumentality includes a handle, and said handle is telescopically received within said sleeve.

3. A barbecue assembly comprising:

a ground penetrator having a sharpened lower end adapted to penetrate into the ground and a knee joined to said penetrator projecting laterally to one side thereof at a location disposed upwardly from said lower end, said knee having a force-impactable upper surface adapted to have a force applied thereagainst, said penetrator having an upper end extending upwardly from said knee, a hollow detachable standard adapted to be telescoped over said upper end of said penetrator with the standard being then relatively rotatably supported on said penetrator and with the base of said standard resting against said knee, an adjuster adjustably positionable on said standard, said adjuster comprising a collar encircling and slidably supported on said standard securable in selected adjusted positions on said standard, and said adjuster further including a sleeve joined to said collar opening to one side of said collar, and a cooking instrumentality having a handle portion which is telescopically received within said sleeve and having a cooking support surface supported by said handle portion at a location laterally to one side of the standard.

* * * * *